United States Patent [19]

Felegi, Jr. et al.

[11] Patent Number: 4,963,603

[45] Date of Patent: Oct. 16, 1990

[54] COMPOSITE FIBERBOARD AND PROCESS OF MANUFACTURE

[75] Inventors: John Felegi, Jr.; Kenneth P. Kehrer, both of Lancaster, Pa.

[73] Assignee: Armstrong World Industries, Inc., Lancaster, Pa.

[21] Appl. No.: 434,041

[22] Filed: Nov. 15, 1989

Related U.S. Application Data

[63] Continuation-in-part of Ser. No. 356,217, May 24, 1989, abandoned, which is a continuation-in-part of Ser. No. 275,914, Nov. 25, 1988.

[51] Int. Cl.$^5$ .................... C08L 89/00; C08K 3/34; C08K 3/40; D21F 11/00
[52] U.S. Cl. .................................. 524/13; 524/35; 524/443; 524/445; 524/494; 162/145; 162/146; 162/147; 162/152
[58] Field of Search ................. 524/13, 35, 443, 445, 524/494; 162/145, 146, 147, 152

[56] References Cited

U.S. PATENT DOCUMENTS 4,711,685 12/1987 Hillman ........................... 156/220

FOREIGN PATENT DOCUMENTS 0266850 5/1988 European Pat. Off. .

*Primary Examiner*—Nathan M. Nutter

[57] ABSTRACT

A novel composite board of mineral wool, perlite, and cellulosic newsprint fibers for use primarily as a ceiling tile is disclosed. The board displays virtually no sag (less than 200 mils) when exposed to high temperature and high humidity while displaying quite acceptable strength. The board, or product without mineral wool or perlite, is manufactured by selective deposition of a latex composition on the cellulosic newsprint fibers.

14 Claims, 2 Drawing Sheets

FLOW DIAGRAM

| 21 LATEX BINDER | 23 CELLULOSIC NEWSPRINT FIBER |
|---|---|
| 22 MINERAL WOOL | 24 PERLITE |

COMPOSITE FIBERBOARD AND PROCESS OF MANUFACTURE

CROSS REFERENCE TO RELATED APPLICATION

This application is a continuation-in-part of pending U.S. patent application Ser. No. 356,217 filed May 24, 1989 and now abandoned, which is a continuation-in-part of pending U.S. patent application Ser. No. 275,914 filed Nov. 25, 1988.

This invention relates to a novel composite fiberboard of improved moisture resistance and its process of manufacture.

BACKGROUND

1. Field of the Invention

The conventional composite fiberboards, typical of those used for acoustical ceilings, are composed of mineral wool, perlite and newsprint, which is primarily cellulosic fibers, as the primary ingredients. These materials are formed into boards from aqueous slurries using an organic binder such as starch.

The mineral wool may be composed of fibers of rock wool or basalt wool. It is also possible to use glass fibers, alone, or mixed with the mineral wool. The fibers, in general, have a diameter of 3 to 6 microns. The fibers may be used in the "sized" or "naked" state. Sizing agents such as mineral oils or acrylic polymer dispersions may be employed. These fibers contribute to the structural integrity and strength of the board.

The perlite is a volcanic glass ore composed of aluminum, calcium or other alkaline earth silicate. Prior to use in the fiberboard process, the perlite ore is expanded at high temperatures to obtain densities of 2 to 10 pounds/cubic foot (pcf), preferably 3 to 7 pcf. Perlite contributes to the bulk and hardness of the board.

The third important ingredient is the so-called "newsprint". Specifically, the newsprint is composed of cellulosic fibers. These fibers contribute to the wet strength of the board as it is converted from the slurry to the substantially solid cake enroute to becoming the board. Hereinafter, these fibers will be referred to as "cellulosic newsprint" fibers.

The mixture may also contain fillers, flame-proofing agents, pigments, water repellants, etc. The fillers employed are usually finely divided clays, e.g. kaolin, ball clay, etc.

In the process of preparing the board, the ingredients are mixed together with the amount of water necessary to provide slurry consistency in conventional mixing and holding equipment. Additional water and "dry broke" may be added to the slurry prior to the addition of the starch binder. The starch is employed in amounts as high as about 15%, based on the three primary ingredients. The "dry broke" is predominately recycled board material that may have been rejected or cut from the commercially acceptable boards, as well as other waste products.

The slurry is then flowed onto the board forming wire of a Fourdrinier through a conventional head box. Suction may be applied as well as pressure, if desired, to assist in drainage and compaction using conventional means.

The disadvantage of these conventional sound-insulating boards is their moisture sensitivity. Their tendency to sag in a moist atmosphere may make it necessary to coat or impregnate the back and/or face of the boards with, for example, thermosetting plastics or other moisture-resistant compositions. Not only does this add the extra coating step, but further drying and heating becomes necessary. In short, a very expensive board results.

2. Description of the prior Art

In U.S Pat. No. 4,587,278, sound-insulating boards which are based on mineral fibers and thermoplastic binders are disclosed to overcome the moisture-sensitive disadvantages of the starch-bound board. The binders disclosed in this patent are polymers having glass transition temperatures from 38° to 80° C. These binders may be inadequate for the boards to retain dimensional stability without any substantial sag when exposed for prolonged periods at high temperatures with high humidity.

In European Laid-Open patent application No. 0 266 850 published May 11, 1988, the applicant discloses the use of thermoplastic binders (latex compositions) having glass transition temperatures anywhere from 35° C. to 115° C. The boards disclosed contain newsprint, perlite, mineral wool and clay as well as the latex binder. They are manufactured by incorporating the latex binder into a previously prepared aqueous slurry of the other ingredients. The resulting boards, according to the disclosure, display acceptable strength as determined by measuring the modulus of rupture (MOR) in accordance with ASTM 367-78. The modulii of rupture, as disclosed in the published application, vary from about 140 to slightly above 180 psi. The applicant also discloses an improvement in "dimensional stability" as measured by the composite board's sag resistance. Specifically, by exposing a 1.5×6 inch (40 mm×150 mm) strip of board to 94° F. (35° C.), and 90% relative humidity for 96 hours While retaining a 330 gram weight at its center, the applicant asserts that he obtained a displacement of the center of the board of 1.0 mm or less.

SUMMARY OF THE INVENTION

The object of this invention is to provide a composite board of mineral wool, perlite and 4–85% by weight of cellulosic newsprint fibers that display substantially no sag (less than 0.2 inches or 200 mils) when a 9×24 inch board, 0.6 inch thick, is supported at each end to form a 23 inch span and exposed to a temperature of 85° F., and a relative humidity of 95% for 24 hours.

The object is accomplished by using 4–15% by weight of a latex composition having a glass transition temperature (Tg) of at least 80° C. in a manner such that the newsprint fibers are coated with the latex substantially completely prior to final binding of the composite mixture by the latex. For purposes of this invention of providing a normal commercial product by a commercially viable process, it is important that the ratio of the latex binder-to-newsprint be no greater than about 1–1.25, preferably no greater than 0.7 and most preferably, no greater than 0.4.

The ratio of the latex binder-to-newsprint being no greater than 0.7, preferably no greater than 0.4, applies to composite boards prepared from compositions containing at least 6% by weight of cellulose. Although these maximum ratios of latex binder-to-newsprint, i.e. 0.7, preferably 0.4, are applicable to cellulose contents below 6% by weight for the purpose of reducing sag in the ultimate composite board, it is advisable to use an additional amount of latex binder, i.e. up to a ratio of latex binder to newsprint of about 1–1.25, to provide the desired strength for the board. In other words, although the lower ratios, i.e. 0.7 and 0.4, are adequate for coating up to 6% newsprint fibers substantially completely with the latex, the use of the higher maximum ratios, i.e. 1–1.25, involving additional latex, is important for final binding of the composite mixture by the latex at these lower proportions of newsprint fibers. i.e. less than 6%, in the composite mixture.

Specifically, the selective deposition of the latex onto the cellulose fibers of the newsprint may be accomplished by any of the following three processes:

1. The most general method is to introduce a coagulant prior to or along with the latex composition in the conventional ceiling board process. The coagulant is added to the whole or part of the board components of 0–87%, preferably 0–75% mineral wool fibers, 5–65% perlite, 0–25% clay, and 4–35% cellulosic newsprint, 4–15% of the latex composition. The latex may be added in one or more steps. To obtain the best results, it is important that sufficient coagulant is added to deposit an amount of latex to coat the available cellulose fibers of the newsprint substantially before the mixture is formed into a suitable wet form. Thereafter, the form is heated to enable the remaining amount of latex to bind the components of the mixture in the form of the board.

2. An alternative method is to selectively deposit the latex composition with a coagulant on a filler such as clay; and then to deposit or coat the clay/latex onto the newsprint fibers before performing the remaining steps to form the board.

3. A third alternative is to selectively deposit a cationic latex onto the cellulosic newsprint fibers or clay filler. The fiber and filler, being anionic, will retain the cationic latex material on its surface.

This alternative eliminates the need for the coagulant. This method may be used alone or in conjunction with the use of an anionic latex and coagulant, as set forth in the methods 1 and 2.

BRIEF DESCRIPTION OF THE DRAWINGS AND THE BEST MODE

The invention will be more clearly understood by referring to the drawings and the description of the best mode for carrying out the invention that follows.

Figure 1:
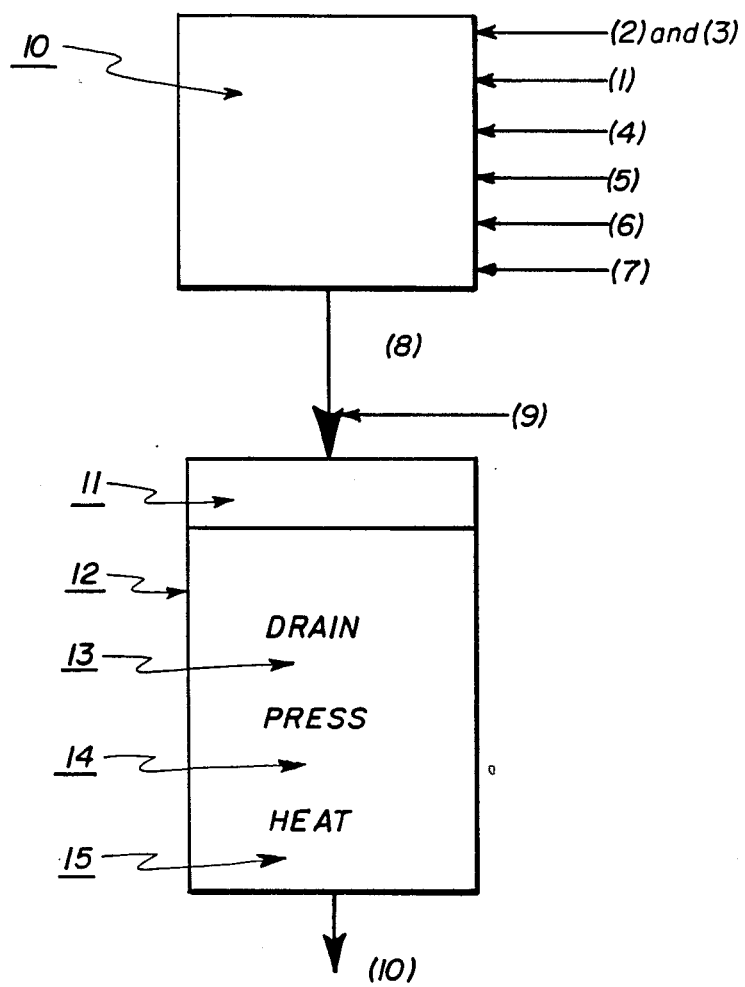
FIG. 1 represents a flow sheet of the preferred method for carrying out the process of the invention.

In the most preferred situation as shown in FIG. 1, the coagulant (2), a poly (diallyldimethylammonium) chloride [DADMAC] having an average molecular weight of about 200,000 and a charge density of 5.92 milliequivalents/gram, is added to a portion of the total latex composition (3). Specifically, an anionic latex emulsion prepared from styrene, methyl methacrylate, and ethyl acrylate, as described, in general, in European Patent Application 0,266,850, may be used. The Tg of the copolymer is about 100° C. Anywhere from 10% to 100%, preferably 10% to 50%, of the total latex composition to be added, is added at this step. To this combination is added a previously prepared aqueous dispersion of the cellulosic newsprint fibers (1) under agitation in the mixer 10. The fiber dispersion is composed of 2–7% by weight of the fibers.

It should be understood that the amounts of coagulant and latex used in this step will depend upon the amount of cellulose fibers present. The amounts are interrelated and may be engineered to optimize the coating effect of the latex on the cellulosic fibers.

In the next step, the mineral wool (4), is added and the mixture is further agitated. Thereafter, if all the coagulants has not been added earlier, additional coagulant and the remainder of the latex (5) plus the perlite (6) and the "dry broke" (7) are added while agitation continues in the mixing tank.

The resultant slurry (8) is pumped onto the board-forming wire of a Fourdrinier through a conventional head box 11. A flocculant (9), a polyacrylamide of extremely high molecular weight, e.g. 2,000,000–10,000,000 and having a charge density of 0.1–0.8 milliequivalents/gram is added to the slurry just prior to its entry into the head box 11. The ingredients used in forming the slurry, based on percent by weight of solids, include about 25% cellulosic newsprint fibers, 35% mineral wool, 30% perlite, and about 10% latex. About 3.3% coagulant (based on the weight of the selectively deposited latex) is used.

The flocculated product is permitted to drain at 13 on the moving wire belt 12 of the Fourdrinier. This is followed by the application of pressure at 14 and heat at 15 to dry the material in the form of a board (10).

The composite board, after the wet-forming process and subsequent drying, is sanded to a specific gauge. The face of the composite board can be punched with acoustical pins to improve the board's acoustical properties. The face of the composite board can be decorated using various methods: fissuring, routing, embossing, etching, painting (face and/or back), or any combination thereof, to produce the finished product. Some of these products are shown in Sweet's General Building Files, Catalog Code 09500/ARO.

It should be understood that, although in the most preferred situation a portion of the latex is isolated with the newsprint fibers to insure optimum coating of the fibers, such isolation is not absolutely necessary. It is also possible to add the coagulant and the latex to a mixture of all the components of the board in such a manner and in such amounts that, relying on the kinetics and surface chemistry of the processes of deposition, one can obtain complete coating of the newsprint's cellulosic fibers and successful binding of all the components with the latex to provide the board of the invention.

It should be understood that these processes can be used to make other products, e.g. gasketing, floor backing, etc., some of which would not include the mineral wool or perlite or clay. However, all products would involve the selective deposition of latex on cellulosic fibers as described herein. It should also be understood that other conventional processes (other than the use of a Fourdrinier) may be used to prepare these products. Thus, wet forming on a cylinder machine or a cast molded process could also produce the products.

An anionic dispersion of a copolymer of styrene, methyl methacrylate and ethyl acrylate has been shown in the latex composition of the preferred embodiment. However, it should be understood that any copolymer, usually having a substantial amount of styrene, but having a Tg of 80° C.–115° C. or higher may be used, preferably a Tg of 100° C. or higher. The latex composition will typically include from 50 to 100 weight percent of a hard monomer, e.g. styrene, methyl methacrylate (whose homopolymer has a Tg of at least 80° C.) and up to 50 weight percent of a soft monomer, e.g. butadiene, ethyl acrylate, butyl acrylate (whose homopolymer has a Tg of less than 35° C.). Preferably, the hard monomer is present in an amount from 65 to 95 weight percent and the soft monomer is present in an amount from 5 to 35 weight percent. An alpha-beta 3-ethylenically unsaturated carboxylic acid such as acrylic, methacrylic, fumaric, itaconic, aconitic, and various alpha, beta-substituted acrylic acids, may also be incorporated in the copolymer to the extent of up to 10 weight percent, based on the weight of the final polymer.

The preferred latex particle diameter is less than or equal to 0.120 micron as measured using Brookhaven Model BI-90 particle size analyzer. To prepare the latex for particle size measurement, 2-3 drops of latex is added to a 0.001 M KCl solution to make a 200–300 ppm latex sample which is then sonicated.

Coagulants useful in the invention may be organic, low molecular weight polymers which reverse the charge on the latex particles without aggregation. The mechanism involves adsorption onto the latex particle. The preferred coagulants for use in this invention are organic polymeric coagulants of low molecular weight (from about 10,000 up to about 1,000,000) and high charge (correspondingly, from about 8 down to about 3 milliequivalents/gram) which adsorb on the particle surfaces. Such coagulants are well known to those skilled in the art and include, inter alia, polyethyleneimines, polyamines, substituted polyamines, etc. The most preferred is poly{diallyldimethylammonium) chloride [DADMAC] those molecular weight is between 10,000 and 1,000,000 and whose charge density is 6.2 milliequivalents/gram.

The following theory is offered to explain the coagulant's mode of action. This theory should not be used to limit the scope of the invention. The coagulant particles first adsorb onto the latex particle surface in a flat configuration. They do not stick out from the surface appreciably. The positive charge of the polymer particles neutralizes the natural negative charge of the latex particles. In fact, the polymer adsorbs strongly enough to overcompensate the negative charge and reverse the latex particles natural charge from negative to positive. Since the cellulosic fibers are negative, the now positively charged latex particles will readily adsorb on the fibers. Also, since the particles are all the same positive charge, they will not aggregate in the presence of the calcium ion in the water. Without the coagulant, the calcium ion may tend to cause the latex particles to stick to the fibers; however, the calcium ion may also cause the latex particles to aggregate. Hence, the optimum function of the coagulant is to reverse the latex particle charge, eliminate the aggregation, and enhance the particle deposition onto the cellulose fibers.

The flocculants useful in the invention are also polymeric. However, they are usually of much higher molecular weight than the coagulants and of lower charge density. Thus, molecular weights for the flocculants may vary from 2,000,000 to 10,000,000 and their charge densities, from 0.1 to 3 milliequivalents per gram. The flocculants may be cationic, anionic, or nonionic. The flocculants that are useful in this field include polyacrylamides, copolymers of acrylamide with substituted acrylates, polyethyleneimides, etc. The preferred flocculant is a cationic polyacrylamide.

Figure 2:
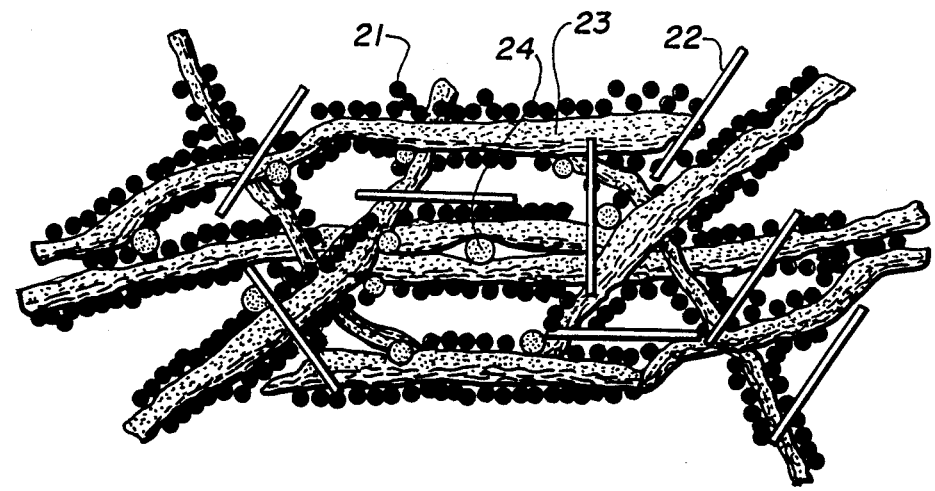
FIG. 2 is a sketch of the cross-section of the fiberboard product of the invention produced by selective deposition of the latex binder.

A cross-section of the product is shown in FIG. 2. The product is composed of latex binder particles 21, mineral wool fibers 22, cellulosic newsprint fibers 23, and the perlite spherulites 24. It will be noted that the latex particles 21 are distributed over the surface of the cellulosic newsprint fibers 23. As discussed previously, this is accomplished by the strategic use of coagulant when using an anionic latex composition or by selective deposition using a cationic latex composition.

Figure 3:
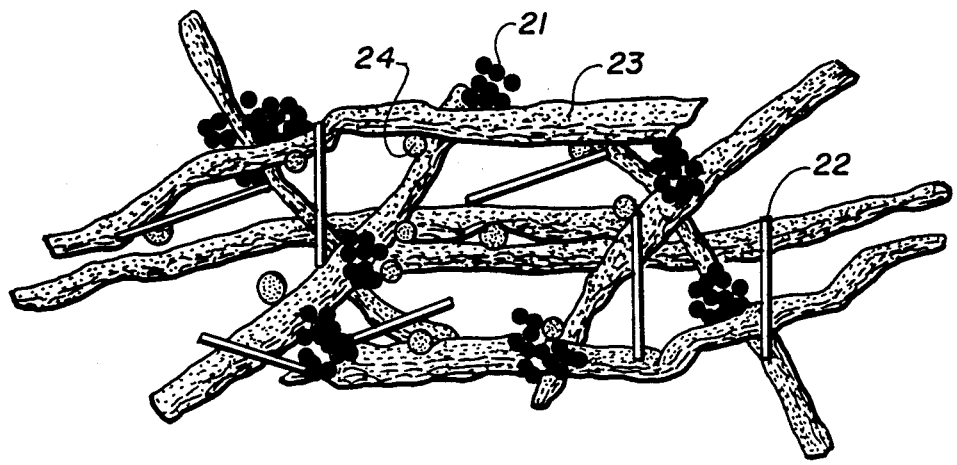
FIG. 3 is a sketch of the cross-section of a fiberboard product produced without selective deposition of the latex binder.

In contrast to FIG. 2, a product composed of latex binder particles 21, mineral wool fibers 22, cellulosic newsprint fibers 23, and perlite spherulites 24 is shown in FIG. 3. This product has obtained without selective deposition of the latex particles 21. Thus, an anionic latex composition, without the use of coagulant, tends to aggregate at the intersections of the fibers in the composite fiberboard. Little or no protection of the cellulosic newsprint fibers is accomplished.

The invention will be more easily understood by referring to the examples that follow. In these examples, all the percentages are by weight unless otherwise specified.

The "sag" in mils, was measured on a 0.6 inch thick board (nominal ⅝ inch board) that was 9 inches wide and 24 inches long. While being supported at both ends to form a 23 inch span, the board was exposed to a temperature of 85° F. and a relative humidity of 95%. After 24 hours of exposure, the displacement of the center of the 24 inch long board is measured in mils.

The modulus of rupture (MOR) of the board is measured by the procedure given in ASTM D-1037. MOR is calculated as being equal to $3PL/2bd^2$ psi where:

P = peak force required to break the sample (lbs.)
L = span between the sample supports (inches)
b = width of the sample (inches)
d = thickness of the sample (inches)

MOR may be corrected for density variations by multiplying by $D^2$ where D = desired density/actual density.

The density of the board products set forth in the following examples are expressed in pounds per board foot (pbf), and is determined by weighing a sample board having dimensions of one foot square and a thickness of one inch. The density calculation for thinner or thicker boards is computed by dividing the weight of a one foot square board sample by the thickness of the board sample expressed in inches.

EXAMPLE 1

1.55 grams of a DADMAC coagulant was dispersed in 35.6 liters of water. 46.9 grams of latex* was then added to the extent of 0.13% solids. 180.5 grams of pulped cellulose fibers in the form of newsprint was added to the extent of 0.6% total solids and the resultant composition was mixed for ten minutes.

*A Dow Chemical Co. carboxylated styrene/acrylate latex entitled "XU30780.00L" having an average particle size of 0.147 micron and a Tg of 100° C.

An additional 25.8 grams latex was added and mixed for one minute. 252.7 grams of mineral wool and 217 grams of perlite were added and mixed for nine minutes to form the final slurry.

0.72 grams of a high charge, high molecular weight polyacrylamide as the flocculant was added until the water became clear and while the slurry was subjected to moderate agitation.

The flocculated furnish was poured into a mold apparatus at 1.6% solids. The furnish was drained on a retaining wire surface. The resulting wet mat was pressed to a thickness of 0.650" and dried at a temperature of 350° to 370° F. in a forced air oven. The resulting board was 14" wide and 26" long, had a thickness of 0.700" and a density of 0.90 pbf. Its composition was as follows:

25% cellulosic newsprint
30% perlite
35% wool fibers, and
10latex (6.5% having been added in the first step and 3.5% having been added thereafter.)

The MOR of the face-sanded board (0.590" thickness) was 158 psi and its "sag" measured—164 mils.

EXAMPLE 2

The procedure of Example 1 was repeated except that the same latex composition containing 72.2 grams of the polymer (the entire 10%) was added in the first step to 1.81 grams of DADMAC (2.5%) coagulant. The remaining ingredients were added as set forth in Example 1 and the board was prepared and tested as in Example 1. Its final composition was identical to that shown in Example 1. The MOR of the board was 151 psi and its "sag" measured—171 mils.

CONTROL EXAMPLE A

The procedure of Example 2 was repeated except that no coagulant was used. All the components—newsprint, mineral wool and perlite—were dispersed in 85.6 liters of water and mixed before the entire latex composition was added. Thereafter, 3.6 grams of the flocculant was added and the board was prepared as in the previous examples for testing.

The MOR of the board was 141 psi; and its "sag" measured—214 mils.

EXAMPLE 3

1.30 grams of a DADMAC coagulant was dispersed in 35.6 liters of water. 39.7 grams of the Latex used in Examples 1 and 2 was then added to the extent of 0.12% solids. 180.5 grams of pulped cellulose fibers in the form of newsprint was added to the extent of 0.6% total solids and the resultant composition was mixed for ten minutes.

An additional 21.7 grams of the Latex was added and mixed for one minute. 252.7 grams of mineral wool and 227.4 grams of perlite were added and mixed for nine minutes to form the final slurry.

0.72 grams of a high charge, high molecular weight polyacrylamide as the flocculant was added until the water became clear and while the slurry was subjected to moderate agitation.

The flocculated furnish was poured into a mold apparatus at 1.6% solids. The furnish was drained on a retaining wire surface. The resulting wet mat was pressed to a thickness of 0.650" and dried at a temperature of 350° to 370° F. in a forced air oven. The resulting board was 14" wide and 26" long, had a thickness of 0.700" and a density of 0.90 pbf. Its composition was as follows:

25% cellulosic newsprint
31.5% perlite
35% wool fibers, and
8.5% latex (5.5% having been added in the first step and 3.0% having been added thereafter.)

The MOR of the face-sanded board (0.590" thickness) was 169 psi and its "sag" measured —155 mils.

EXAMPLE 4

The procedure of Example 3 was repeated except that the latex composition containing 61.4 grams (the entire 8.5%) of the polymer was added in the first step to 1.55 grams of DADMAO (2.5%) coagulant. The remaining ingredients were added as set forth in Example 3 and the board was prepared and tested as in Example 3. Its final composition was identical to that shown in Example 3.

The MOR of the board was 154 psi and its "sag" measured —134 mils.

EXAMPLE 5

1.81 grams of DADMAC was dispersed in 35.6 liters of water. 36.1 grams of a latex** with a 0.08 micron particle size (one-half the particle size used in the previous examples) was then added to the extent of 0.11% solids. 180.5 grams of pulped cellulosic newsprint fibers was added to the extent of 0.6% total solids and the resultant composition was mixed for ten minutes.

**A B. F. Goodrich styrene/acrylate latex entitled "Experimental Latex", #913-264-102, having an average particle size of about 0.110 micron and a Tg of 103° C.

An additional 25.7 grams latex was added and mixed for one minute. 252.7 grams of mineral wool and 227.4 grams of perlite were added and mixed for nine minutes to form the final slurry.

0.72 grams of a high charge, high molecular weight polyacrylamide was added until the water became clear and while the slurry was subjected to moderate agitation.

The flocculated furnish was poured into a mold apparatus at 1.6% solids. The furnish was drained on a retaining wire surface. The resulting wet mat was pressed to a thickness of 0.650" and dried at a temperature of 350° to 370° F. in a forced air oven. The resulting board was 14" wide and 26" long, had a thickness of 0.700" and a density of 0.90 pbf. Its composition was as. follows:

25% cellulosic newsprint
31.5% perlite
35% wool fibers, and
8.5% latex (5.0% having been added in the first step and 3.5% having been added thereafter).

The MOR of the face-sanded board (0.590" thickness) was 164 psi and its "sag" measured —112 mils.

EXAMPLE 6

1.16 grams of DADMAC was dispersed in 35.6 liters of water. 25.3 grams of a similar particle size latex** as in Example 5 was then added to the extent of 0.07% solids. 180.5 grams of pulped cellulosic newsprint fibers was added to the extent of 0.6% total solids and the resultant composition was mixed for ten minutes.

An additional 44.0 grams latex** was added and mixed for one minute. 262.7 grams of mineral wool and 233.2 grams of perlite were added and mixed for nine minutes to form the final slurry.

0.72 grams of a high charge, high molecular weight polyacrylamide was added until the water became clear and while the slurry was subjected to moderate agitation.

The flocculated furnish was poured into a mold apparatus at 1.6% solids. The furnish was drained on a retaining wire surface. The resulting wet mat was pressed to a thickness of 0.650" and dried at a temperature of 350° to 370° F. in a forced air oven. The resulting board was 14" wide and 26" long, had a thickness of 0.700" and a density of 0.90 pbf. Its composition was as follows:

25% cellulosic newsprint
32.3% perlite
35% wool fibers, and
9.3% latex (3.2% having been added in the first step and 6.1% having been added thereafter.)

The MOR of the race-sanded board (0.590" thickness) was 204 psi and its "sag" measured—145 mils.

What is claimed is:

1. A composite board which comprises up to 87% by weight mineral wool, 5–65% by weight perlite, up to 25% by weight clay, 4–35% by weight cellulosic newsprint composed primarily of cellulosic fibers, and 2–15% by weight of a thermoplastic polymeric binder having a glass transition temperature of from 80° C. to 115° C., the ratio of said binder to said cellulosic newsprint being no greater than about 1.25 when said cellulosic newsprint content is less than 6% by weight and said ratio being no greater than 0.7 when said cellulosic newsprint content is at least 6% by weight, wherein the cellulose fibers in said board are substantially completely coated with said thermoplastic binder, said board displaying a sag of less than 200 mils when a 0.6 inch thick sample, 9 inches wide and 24 inches long is supported at both ends and exposed to a temperature of 85° F. and a relative humidity of 95% for 24 hours.

2. A composite board which comprises up to 75% by weight mineral wool, 5–65% by weight perlite, up to 25% by weight clay, 4–35% by weight cellulosic newsprint composed primarily of cellulosic fibers, and 4–15% by weight of a thermoplastic polymeric binder having a glass transition temperature of from 80° C. to 115° C., the ratio of said binder to said cellulosic newsprint being no greater than about 1 when said cellulosic newsprint content is less than 6% by weight and said ratio being no greater than 0.4 when said cellulosic newsprint content is at least 6% by weight, wherein the cellulose fibers in said board are substantially completely coated with said thermoplastic binder, said board displaying a sag of less than 200 mils when a 0.6 inch thick sample, 9 inches wide and 24 inches long is supported at both ends and exposed to a temperature of 85° F. and a relative humidity of 95% for 24 hours.

3. A composite board which comprises about 20–50% by weight mineral wool, about 20–50% by weight perlite, up to 25% by weight clay, 10–30% by weight cellulosic newsprint composed primarily of cellulosic fibers, and 4–15% by weight of a thermoplastic polymeric binder having a glass transition temperature of from 80° C. to 115° C., the ratio of said binder to said cellulosic newsprint being no greater than about 0.7, wherein the cellulosic fibers in said board are substantially completely coated with said thermoplastic binder, said board displaying a sag of less than 200 mils when a 0.6 inch thick sample, 9 inches wide and 24 inches long is supported at both ends and exposed to a temperature of 85° F. and a relative humidity of 95% for 24 hours.

4. A composite board which comprises about 20–50% by weight mineral wool, about 20–50% by weight perlite, up to 25% by weight clay. 10–30% by weight cellulosic newsprint composed primarily of cellulosic fibers, and 4–15% by weight of a thermoplastic polymeric binder having a glass transition temperature of from 80° C. to 115° C., the ratio of said binder to said cellulosic newsprint being no greater than about 0.7, wherein the cellulosic fibers in said board are substantially completely coated with said thermoplastic binder; said board displaying a sag of less than 200 mils when a 0.6 inch thick sample, 9 inches wide and 24 inches long is supported at both ends and exposed to a temperature of 85° F. and a relative humidity of 95% for 24 hours, and a modulus of rupture, as measured by the procedure in ASTM D-1087, of greater than 150 psi.

5. A composite board as in claim 4 comprising 20–40% mineral wool, 20–35% perlite, 10–30% cellulosic newsprint and 6–10% latex having a glass transition temperature of from 80° C. to 115° C.

6. A composite board as in claim 4 comprising 20–40% mineral wool, 20–35% perlite, 10–30% cellulosic newsprint and 6–10% latex having a glass transition temperature of from 100° C. to 115° C.

7. A composite board as in claim 4 comprising about 20–50% mineral wool, about 20–50% perlite, about 13–23% cellulosic newsprint, and about 4–0.6% latex having a glass transition temperature of from 100° C. to 115° C.

8. A composite board as in claim 4 comprising about 35% mineral wool, about 30% perlite, about 25% cellulosic newsprint, about 8.5–10% latex having a glass transition temperature of 100° C. and where the ratio of said latex to said cellulosic newsprint is no greater than 0.4.

9. In the process for making a product containing at least the components of 4–35% by weight cellulosic newsprint composed primarily of cellulose fibers, and 2–15% by weight of a thermoplastic polymeric binder wherein the components are mixed with water to form an aqueous slurry, and said slurry is flocculated While being fed to a mold and shaped, the shaped material drained of liquid and pressed into the shape and thickness of said product and then heated to solidify said product, the improvement wherein said polymeric binder is coated on the cellulose fibers of the newsprint substantially completely before the slurry is fed to the mold and the ratio of binder-to-cellulosic newsprint used is no greater than about 1.25.

10. In the process for making a composite board containing at least the components of mineral wool perlite. 10–30% by weight cellulosic newsprint composed primarily of cellulose fibers, and 4–15% by weight of a thermoplastic polymeric binder wherein the components are mixed with water to form an aqueous slurry, and said slurry is flocculated while being fed to a mold and shaped, the shaped material drained of liquid and pressed into the shape and thickness of said board and then heated to solidify said board, the improvement wherein said polymeric binder is coated on the cellulose fibers of the newsprint substantially completely before the slurry is fed to the mold and the ratio of binder-to-cellulosic newsprint used is no greater than 0.7.

11. A process as in claim 10 wherein said thermoplastic binder is an anionic latex dispersion in which the latex particle diameter is no greater than 0.12 micron.

12. A process as in claim 10 wherein said thermoplastic binder is an anionic latex dispersion and a coagulant is added to the mixture of components before said slurry is flocculated.

13. A process as in claim 12 wherein said mixture is formed in two steps, the first step in which only water, newsprint composed primarily of cellulose fibers, coagulant and a portion of the anionic latex dispersion are used to form the mixture and the second step in which the remaining components and the remainder of said latex dispersion and, optionally, additional coagulant are added to form the mixture.

14. In the process for making a product containing at least the components of 4–35% by weight cellulosic newsprint composed primarily of cellulose fibers, and 2–15% by weight of a thermoplastic polymeric binder wherein the components are mixed with water to form an aqueous slurry, and said slurry is flocculated while being fed to a mold and shaped, the shaped material drained of liquid and pressed into the shape and thickness of said product and then heated to solidify said product, the improvement wherein said polymeric binder is coated on the cellulose fibers of the newsprint substantially completely before the slurry is fed to the mold.

* * * * *

UNITED STATES PATENT AND TRADEMARK OFFICE
CERTIFICATE OF CORRECTION

PATENT NO. : 4,963,603
DATED : October 16, 1990
INVENTOR(S) : John Felegi, Jr. et al.

It is certified that error appears in the above-identified patent and that said Letters Patent is hereby corrected as shown below:

Column 2, line 43, "4-85%" should read --4-35%--.
Column 3, line 18, insert --followed by the addition of as little as 2%, preferably-- after "newsprint," and before "4-15%".
Column 6, line 59, "25.8 grams" should read --25.3 grams--.
Column 7, line 10, "10latex" should read --10% latex--.
Column 7, line 13, "164 mils" should read --154 mils--.
Column 7, line 30, "85.6" should read --35.6--.
Column 8, line 6, "DADMAO" should read --DADMAC--.
Column 8, line 23, "#913-264-102" should read --#913-254-102--.
Column 8, line 57, "262.7 grams" should read --252.7 grams--.
Column 9, line 9, "race-sanded" should read --face-sanded--.

In the Claims:
Claim 4, column 10, line 7, "ASTM-D-1087" should read --ASTM-D-1037--.
Claim 7, column 10, line 18, "4-0.6%" should read --4-10.5%--.

Signed and Sealed this

Fourth Day of February, 1992

Attest:

HARRY F. MANBECK, JR.

Attesting Officer

Commissioner of Patents and Trademarks